United States Patent
Ikeda et al.

(10) Patent No.: US 9,166,420 B2
(45) Date of Patent: Oct. 20, 2015

(54) BATTERY PACK CONTROLLER

(75) Inventors: Tomohiro Ikeda, Kakegawa (JP); Ryuta Takishita, Kakegawa (JP); Kazuyuki Kawashita, Kakegawa (JP)

(73) Assignee: Yazaki Corporation, Tokyo (JP)

( * ) Notice: Subject to any disclaimer, the term of this patent is extended or adjusted under 35 U.S.C. 154(b) by 430 days.

(21) Appl. No.: 13/554,109

(22) Filed: Jul. 20, 2012

(65) Prior Publication Data

US 2013/0020987 A1 Jan. 24, 2013

(30) Foreign Application Priority Data

Jul. 21, 2011 (JP) ................................. 2011-159542

(51) Int. Cl.
*H02J 7/00* (2006.01)
*H01M 10/42* (2006.01)

(52) U.S. Cl.
CPC ........... *H02J 7/0031* (2013.01); *H01M 10/425* (2013.01); *H01M 2010/4271* (2013.01)

(58) Field of Classification Search
CPC .................. H01M 10/425; H01M 2010/4271; H02J 7/0031
USPC ............................ 361/622, 624, 626; 320/107
See application file for complete search history.

(56) References Cited

U.S. PATENT DOCUMENTS

| | | | | |
|---|---|---|---|---|
| 5,675,223 | A * | 10/1997 | Yoshizawa et al. | 318/139 |
| 6,168,470 | B1 | 1/2001 | Ikeda et al. | |
| 7,301,755 | B2 * | 11/2007 | Rodriguez et al. | 361/676 |
| 7,710,721 | B2 * | 5/2010 | Matsuo et al. | 361/699 |
| 7,772,799 | B2 * | 8/2010 | Wu | 320/104 |
| 2002/0102457 | A1 | 8/2002 | Oogami et al. | |
| 2004/0212342 | A1 * | 10/2004 | Batson | 320/107 |
| 2004/0228094 | A1 * | 11/2004 | Ahmed et al. | 361/702 |
| 2005/0013095 | A1 * | 1/2005 | Oda | 361/601 |
| 2005/0221640 | A1 * | 10/2005 | Saka | 439/76.2 |
| 2007/0080662 | A1 * | 4/2007 | Wu | 320/110 |
| 2011/0299229 | A1 * | 12/2011 | De La Reza et al. | 361/624 |

FOREIGN PATENT DOCUMENTS

JP 2009-289431 A 12/2009

OTHER PUBLICATIONS

Communication dated Mar. 31, 2014 from the State Intellectual Property Office of P.R. China in a counterpart application No. 201210253720.X.
Office Action dated Jun. 18, 2014, issued by the Canadian Intellectual Property Office in counterpart Canadian Application No. 2,783,527.

\* cited by examiner

*Primary Examiner* — Anatoly Vortman
(74) *Attorney, Agent, or Firm* — Sughrue Mion, PLLC

(57) ABSTRACT

A battery pack controller is provided having electric wires of the main wiring lines of a precharge circuit laid on the front surface of a base plate. LA terminals (i.e., ring terminals) connected to the electric wires are clamped by screws and the main-circuit bus bars to the relay terminal portions of a main relay mounted on the rear surface. Further, each of the LA terminals (i.e., ring terminals) has a wing portion protruding beyond the protuberant height of an electric-wire connection portion. An electric wire is bent and disposed to extend from the front surface side of the base plate toward the relay terminal portion, a terminal accommodation portion in which the LA terminals (i.e., ring terminals) are accommodated is provided at a part extending from the electric-wire bent portion to the relay terminal portion, and bottom grooves are formed in the terminal accommodation portion into which the wing portions are inserted.

3 Claims, 5 Drawing Sheets

BATTERY PACK CONTROLLER

BACKGROUND OF THE INVENTION

The present application is based on Japanese patent application No. 2011-159542 filed on Jul. 21, 2011, and the contents of the patent application are hereby incorporated by reference.

The present invention relates to a battery pack controller. More particularly, the invention relates to a battery pack controller which includes a closing control circuit for a main contactor that feeds a drive motor with electricity from a battery pack mounted on a vehicle such as an electric automobile.

It has been known that, in closing a main contactor (also termed "main relay") which feeds a drive motor with electricity from a battery pack mounted on an electric automobile or a similar vehicle, an excessive initial charging current flows through a capacitor built in an inverter. This initial charging current can cause an obstacle to the protective function of a fuse or the like, or to damage the main contactor. Therefore, a precharge circuit which suppresses the initial charging current of the inverter is disposed. By way of example, the precharge circuit is connected in parallel with the main contactor which turns ON/OFF a power feed to the inverter. The precharge circuit has the function of limiting and feeding a charging current for a controller before the main contactor is closed, and closing the main contactor after the initial charging has been completed.

A battery pack controller is so formed that a main relay constituting the main contactor, the components of the precharge circuit and the components of any other control circuit are mounted on one surface of a base plate, and the wiring lines of the precharge circuit and the wiring lines of any other control circuit are laid on the other surface of the base plate. One of the pair of relay terminals of the main relay is connected to the electrode (for example, the positive electrode) of the battery pack, while the other relay terminal is connected to one input terminal of the inverter. In general, the battery pack controller is attached to the end part of the battery pack, and one relay terminal is directly connected to the electrode of the battery pack through a plate-like main circuit conductor (bus bar), while the other relay terminal is connected to a lead-out terminal by the main circuit bus bar. An electric wire terminal (a ring terminal, known as an LA terminal) which is connected to the inverter, is clamped to the lead-out terminal by a screw.

Meanwhile, the main wiring lines of the precharge circuit, which is connected in parallel with the main relay, are connected to one pair of main circuit bus bars which are in turn connected to one pair of relay terminals of the main relay. In a case where the main wiring lines of the precharge circuit are formed using bus bars (hereinbelow, termed "precharge-circuit bus bars"), the pair of main circuit bus bars and precharge-circuit bus bars are respectively clamped to the relay terminal portions by screws. Further, the entirety of the bus bars are protected in a manner to be surrounded with a resin-made protective cover (refer to, for example, Japanese Patent Publication No. JP-A-2009-289431). In a case where the main wiring lines of the precharge circuit are formed of electric wires instead of the bus bars, one pair of round terminals (a ring terminal, known as an LA terminals) connected to the electric wires are clamped to the pair of relay terminal portions by screws together with the pair of main circuit bus bars.

In the case where the main wiring lines of the precharge circuit are formed using the bus bars, the impulse noise of the ON/OFF of the main relay is sometimes amplified by the protective case, and hence, the reduction of the noise becomes a problem. On the other hand, in the case where the main wiring lines of the precharge circuit are formed of the electric wires, the main circuit bus bars and the LA terminals (i.e., ring terminals) with the electric wires are clamped to the relay terminal portions by the screws. Since, however, the LA terminal (i.e., ring terminal) turns and is difficult to position at the screw clamping, there is the problem of an inferior assemblability.

The problem that the invention intends to solve is to improve the assemblability of LA terminals (i.e., ring terminals) with electric wires, in forming the main wiring lines of a precharge circuit out of electric wires and reducing noise.

SUMMARY

The present invention has been made in view of the above circumstances, and has an object to provide a battery pack controller, comprising:

a base plate, control components including components of a main relay and a precharge circuit mounted on one surface of said main base plate, and one pair of terminals with electric wires, which are disposed on the other surface of said base plate and which connect the precharge circuit in parallel with the main relay, wherein one of the terminals with the electric wires and one of the main circuit bus bars connected to one electrode of a battery pack, and the other of the terminals with the electric wires and the other of the main circuit bus bars connected to a lead-out terminal to which an inverter is connected, are respectively clamped to one pair of relay terminal portions of the main relay by screws;

each of the terminals with the electric wires has a wing portion which protrudes beyond a protuberant height of an electric wire connection portion from a plane position of the terminal on either a terminal side or an electric wire side of the electric wire connection portion;

the electric wires are bent and disposed so as to extend from the other surface side of the base plate toward the relay terminal portions on one surface side and are clamped to the relay terminal portions by the screws together with the main circuit bus bars; and the base plate is formed with a terminal accommodation portion which accommodates the terminal with the electric wire at a part extending from an electric wire bent portion to the relay terminal portion and is formed having grooves into which the wing portion is inserted.

The base plate may be formed with an electric wire holding portion at an opposite side of the relay terminal portion with respect to the electric wire bent portion along the electric wire, on the other surface side.

More specifically, according to the battery pack controller of the present invention, the main wiring lines (precharge wiring lines) of the precharge circuit are formed of the electric wirings, and hence, a protective case for bus bars which prevent the amplification of the impulse noise of the ON/OFF of the main relay is unnecessary, so that noise can be reduced. Moreover, wing portions each of which protrudes beyond the protuberant height of the electric wire connection portion from the plane position of each of the LA terminals (i.e., ring terminal) with the electric wires are formed on the LA terminal (i.e., ring terminal) side or electric wire side of the electric wire connection portion of each of the LA terminals (i.e., ring terminals) with the electric wires. The LA terminals (i.e., ring terminals) are clamped to the relay terminal portions by the screws, the terminal accommodation portion, in which the LA terminals (i.e., ring terminals) with the electric wires are accommodated, is formed at the part which extends from the electric wire bent portion to the relay terminal portion, and the grooves into which the wing portion is inserted are formed in the terminal accommodation portion. Therefore, positioning the LA terminals (i.e., ring terminals) in the case such that with the electric wires are clamped to the relay terminal portions by the screws is easy, and the cooperation between the wing portion and the grooves allows the co-turning of the LA terminals to be regulated at the screw clamping so that the positioning is facilitated and an assemblability can be improved.

It is preferable that, in order to match the screw through hole of each of the LA terminals (i.e., ring terminals) of the electric wires with the position of the screw hole of the corresponding relay terminal portion, a stepped part or the like protrusion which regulates the distal end position of the LA terminal (i.e., ring terminal) with the electric wire is formed. The stepped part is formed in the insertion direction of the wing portion and is formed within the groove into which the wing portion is inserted, or at the tail end of the groove.

According to the present invention, in forming the main wiring lines of a precharge circuit out of electric wires and reducing noise, the assemblability of LA terminals (i.e., ring terminals) with electric wires can be improved.

DETAILED DESCRIPTION OF EMBODIMENTS

Figure 4:
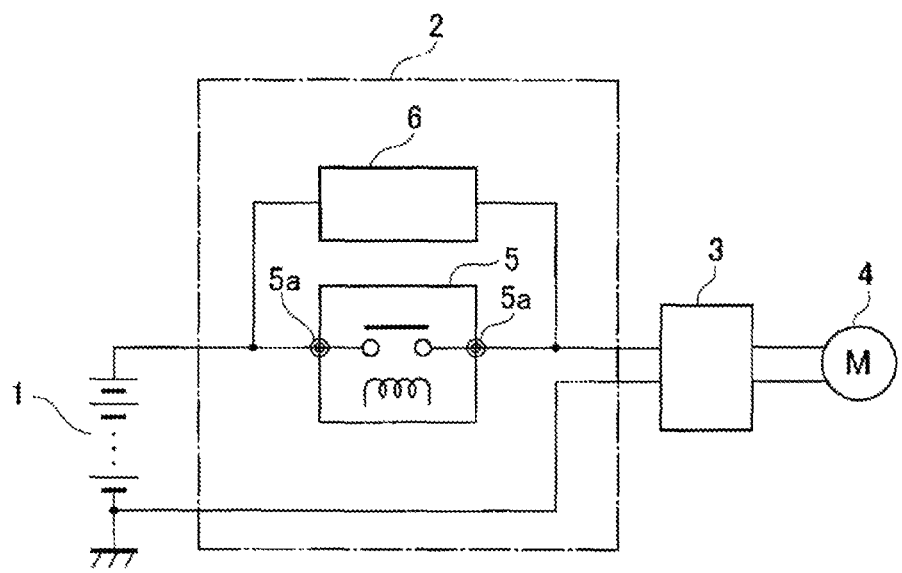
FIG. 4 is a conceptual diagram of the power feed circuit of the drive motor of a vehicle which is furnished with the battery pack controller in the embodiment of the present invention.

A battery pack controller in an embodiment of the present invention will be described with reference to FIGS. 1A-1C to FIG. 4. As shown in FIG. 4, electricity is fed from a battery pack 1, which is mounted on a vehicle such as an electric automobile, through a battery pack controller 2 and an inverter 3 to a drive motor 4. The battery pack controller 2 includes a main relay 5 which turns ON/OFF a supply voltage that is fed to the inverter 3, and a precharge circuit 6 which is connected in parallel with the main relay 5. The precharge circuit 6 is a circuit which feeds the initial charging current of a capacitor that is built in the inverter 3. This precharge circuit charges the capacitor of the inverter 3 with the limited initial charging current, before the main relay 5 is closed, and the precharge circuit closes the main relay 5 after the charging has been completed. Although no illustration is made, the battery pack controller 2 is, in general, disposed in a manner to be attached to the battery pack 1 being a battery assembly in which a plurality of batteries are connected in series.

Figure 2:
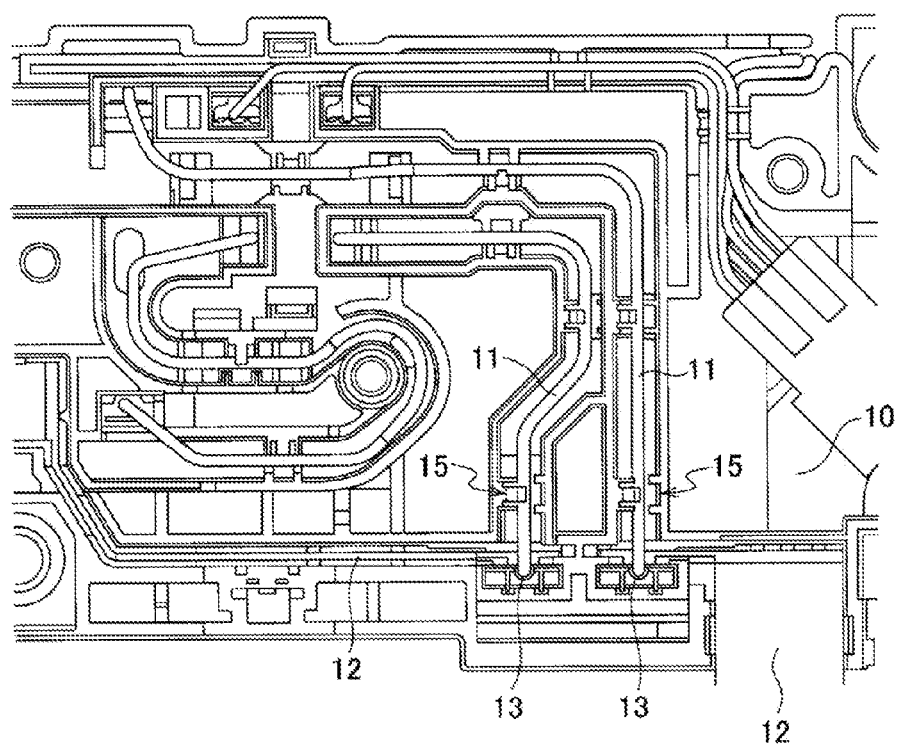
FIG. 2 is a plan view showing the state of the wiring of a precharge circuit on one surface side of the base plate of the battery pack controller in the embodiment of the present invention.

As shown in FIG. 2, the battery pack controller 2 includes a base plate 10 which is formed of a resin. Electric wires 11 and 11, which are the main wiring lines (precharge wiring lines) of the precharge circuit 6, are laid on, for example, the front surface of the base plate 10. Control components, which include the components of the main relay 5 and the precharge circuit 6, are fixed on, for example, the rear surface of the base plate 10. Each of the electric wires 11 has an LA terminal (i.e., ring terminal) 13 with an electric wire, in which the LA terminal (i.e., ring terminal) 13 is crimped and connected at one end to the electric wire. At the other end, the LA terminal 13 is connected to the control component on the rear surface of the base plate 10 through a connector. One pair of relay terminal portions 5a of the main relay 5 are mounted with their terminal surfaces located at the edge parts of the base plate 10 perpendicular to the rear surface of the base plate 10. A main circuit bus bar 12, which is made of a plate-like conductor connected to the common electrode (for example, the positive electrode) of the battery pack 1 is connected to one relay terminal portion 5a. The other main circuit bus bar 12 is connected to the other relay terminal portion 5a, and this main circuit bus bar 12 is connected to a lead-out terminal to which one input terminal of the inverter 3 is connected. The outer surfaces of the respective bus bars 12 connected to the pair of relay terminal portions 5a are located in conformity with the pull-down positions of the LA terminals (i.e., ring terminals) 13 with the electric wires. Thus, the LA terminals (i.e., ring terminals) 13 connected to the electric wires of the precharge circuit 6 are clamped by screws to the respective relay terminal portions 5a in a manner to hold the corresponding bus bars 12 therebetween.

The precharge circuit 6 in this embodiment is configured as a series circuit consisting of a current-limiting resistor and a precharge relay, and the current-limiting resistor and the precharge relay are mounted on the rear surface of the base plate 10. Incidentally, the precharge circuit 6 is not restricted to the series circuit consisting of the current-limiting resistor and the precharge relay. However, the initial charging current of the capacitor may be limited by opening and closing a precharge switch. The battery pack controller 2 can be configured to include, not only the precharge circuit 6, but also a control circuit which detects the voltages of the individual batteries of the battery pack 1 and which charges the individual batteries equally.

Figure 3:
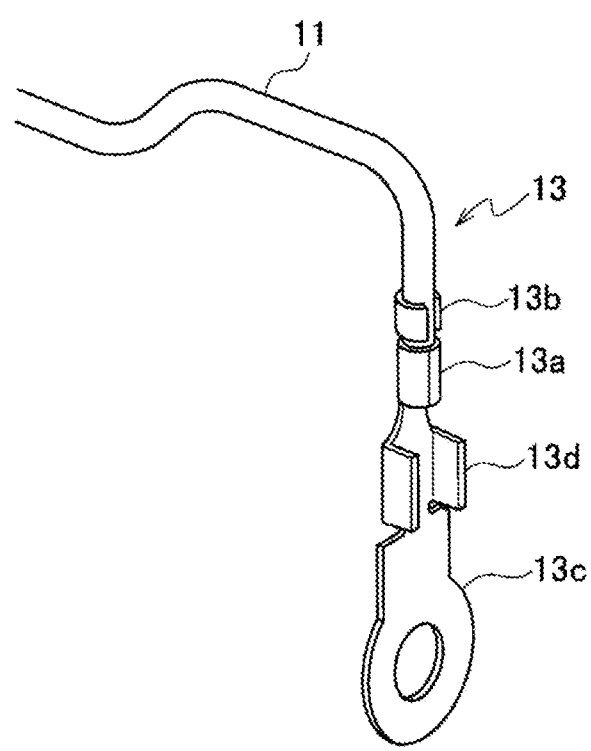
FIG. 3 is a perspective view showing the configuration of an LA terminal (i.e., ring terminals) with an electric wire, in the embodiment of the present invention.

The configuration in which the LA terminal (i.e., ring terminal) 13 connected to the electric wire is clamped by the screw to the main circuit bus bar 12 and connected to the relay terminal portion 5a will be described with reference to FIGS. 1A-1C and FIG. 3. As shown in FIG. 3, the LA terminal (i.e., ring terminal) 13 with the electric wire is connected by crimping the core crimp portion 13a of the LA terminal (i.e., ring terminal) 13 to a core of the electric wire 11 at one end of the electric wire 11. The LA terminal (i.e., ring terminal) 13 with the electric wire is fixed with an electric wire crimp portion 13b crimped to the end part of the insulating cover. A U-shaped wing portion 13d, which protrudes beyond the protuberant height of the core crimp portion 13a or the electric wire crimp portion 13b from the plane position of the LA terminal (i.e., ring terminal) 13, is formed between the terminal portion 13c and core crimp portion 13a of the LA terminal (i.e., ring terminal) 13 with the electric wire. The wing portion 13d may be formed so as to be located on the side of the electric wire 11 with respect to the core crimp portion 13a.

One pair of relay terminal portions 5a of the main relay 5 are fixed on the rear surface of the base plate 10 and are located and disposed at the edge parts of one side of the base plate 10. A terminal accommodation portion 14, in which a space for accommodating the LA terminals (i.e., ring terminal) 13 with the electric wires is formed, is provided so as to be suspended by the side of the base plate 10, in accordance with the positions of the pair of relay terminal portions 5a. The terminal accommodation portion 14 is formed with slits 14a each having a thin section into which the terminal portion 13c of the LA terminal (i.e., ring terminal) 13 may be inserted, in accordance with the position of the terminal surface of the relay terminal portion 5a. The terminal accommodation portion 14 is formed with spaces 14b into each of which the core crimp portion 13a, the electric wire crimp portion 13b, and the wing portion 13d are insertable, in accordance with the slits 14a. The terminal accommodation portion 14 is formed with grooves 14d into each of which the wing portion 13d is inserted and guided, along the suspending direction of this terminal accommodation portion 14. In order to determine if the screw through hole of the LA terminal (i.e., ring terminal) 13 with the electric wire matches the position of the screw hole of the relay terminal portion 5a, a bottom wall 14e, which regulates the distal end position of the wing portion 13d in the insertion direction thereof, is formed at the tail end of the groove 14d. The bottom wall 14e in this embodiment is the bottom surface of the terminal accommodation portion 14. However, the bottom wall is not restricted thereto, and may be a means capable of regulating the insertion position of the wing portion 13d, such as a protuberance which regulates the insertion depth of the wing portion 13d.

The electric wires 11 of the LA terminals (i.e., ring terminals) 13 with the electric wires, which are accommodated in the terminal accommodation portion 14, are bent along the front surface of the base plate 10 from the side edge thereof and are arranged along laying paths formed on the front surface of the base plate 10. This configuration allows components formed on the rear surface of the base plate 10 to be connected to the LA terminals (i.e., ring terminal) 13. In the laying paths, electric wire holding portions which hold the electric wires 11 are disposed at appropriate positions. Electric wire holding portions 15 are disposed along the laying paths at positions near those bent portions 11a of the electric wires 11 which are bent at the side edge of the base plate 10 from the LA terminals (i.e., ring terminals) 13 with the electric wires. Each of the electric wire holding portions 15 is formed to include a plurality of pairs of protrusive pieces 15a which are erected from the front surface of the base plate 10 so as to oppose each other, with the laying paths held therebetween. Further, hook-shaped protrusive pieces 15b are erected so as to be located between the two protrusive pieces 15a juxtaposed in a laying direction. In addition, the hook-shaped protrusive pieces 15b are pushed and expanded to insert the electric wires 11 between the plurality of pairs of protrusive pieces 15a. Thus, the hook-shaped protrusive pieces 15b return to their original positions, and gaps formed by the protrusive pieces 15a and the protrusive pieces 15b become narrower than the diameter of the electric wires 11, so that the electric wires 11 are held while being suppressed from slipping out.

Figure 1A:
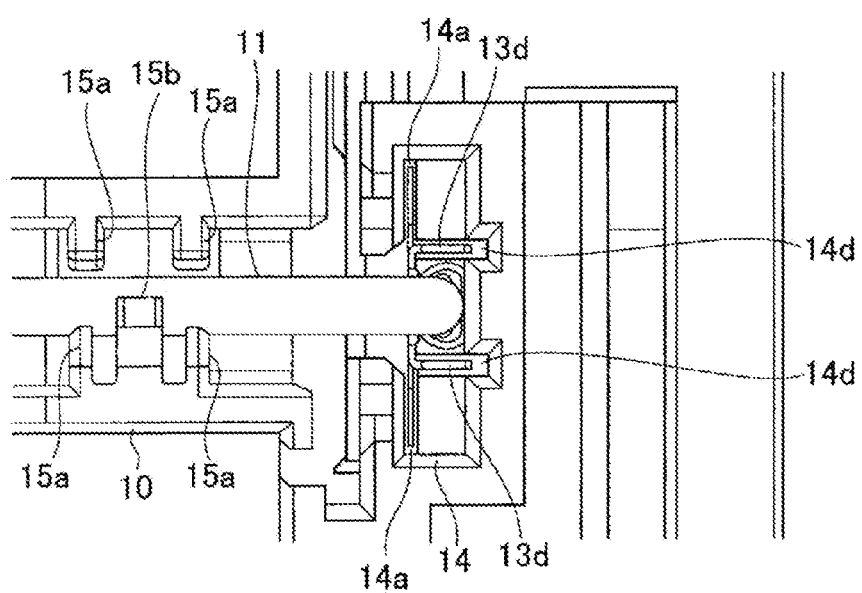
FIG. 1A is a plan view of the principal portions of a battery pack controller in an embodiment of the present invention.
Figure 1B:
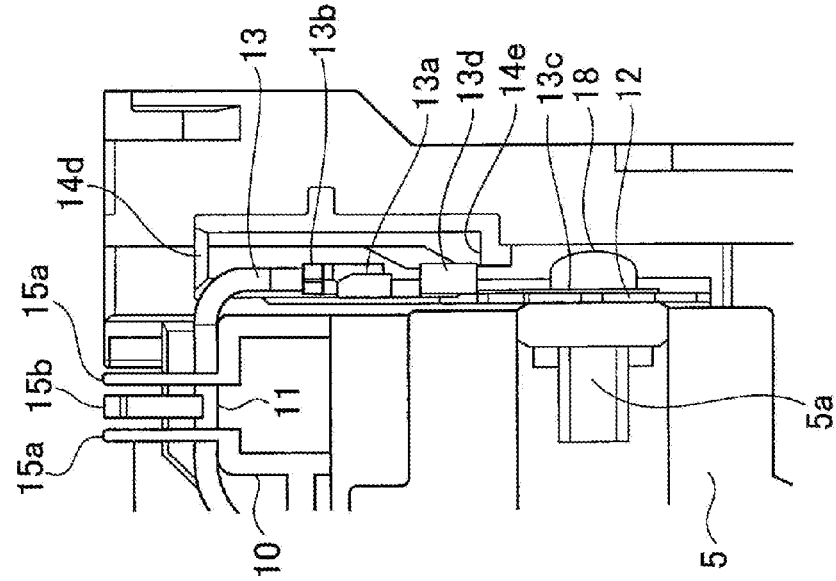
FIG. 1B is a side view of the principal portions of a battery pack controller in an embodiment of the present invention.

There will be described the assembly, operation and advantage of the embodiment. As shown in FIG. 1B, the main circuit bus bar 12 is formed in a manner to be connectible to the relay terminal portion 5a. Regarding the LA terminal (i.e., ring terminal) 13 with the electric wire, the leg parts of the wing portion 13d are caused to abut on the bottom wall 14e in such a way that the terminal portion 13c is inserted into the upper slit 14a of the terminal accommodation portion 14. Accordingly, the wing portion 13d, the core crimp portion 13a and the electric wire crimp portion 13b are subsequently inserted into the space 14b in the order mentioned, and the U-shaped leg parts of the wing portion 13d are inserted into the grooves 14d. At the position of the abutment, the screw through hole of the LA terminal (i.e., ring terminal) 13 with the electric wire is registered with the position of the screw hole of the relay terminal portion 5a. That is, the LA terminal (i.e., ring terminal) 13 with the electric wire is inserted into the position shown in FIG. 1B. In addition, the part of the electric wire 11 near the bent portion 11a thereof is pushed into the electric wire holding portion 15 and is held.

Figure 1C:
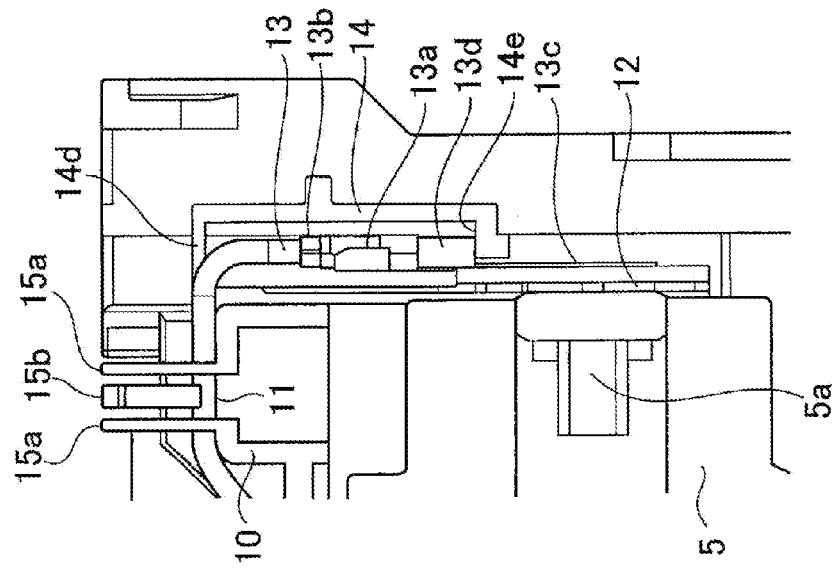
FIG. 1C is a side view of the principal portions of a battery pack controller after assemblage in an embodiment of the present invention.

Subsequently, as shown in FIG. 1C, a screw 18 is inserted through the screw through hole of the main circuit bus bar 12 from the screw through hole of the terminal portion 13c. The screw 18 is threadably engaged with a screw hole formed in the relay terminal portion 5a. Thus, the main circuit bus bar 12 and the LA terminal (i.e., ring terminal) 13 with the electric wire are both clamped to the relay terminal portion 5a. In threadably engaging the screw 18 with the screw hole of the relay terminal portion 5a, the turning force of the screw 18 acts on the LA terminal (i.e., ring terminal) 13 with the electric wire. Since the wing portion 13d of the LA terminal (i.e., ring terminal) 13 with the electric wire is inserted into the grooves 14d, the LA terminal (i.e., ring terminal) 13 with the electric wire is prevented from turning with respect to the threadable engagement of the screw 18. Thus, the assembling efficiency of the LA terminal (i.e., ring terminal) 13 with the electric wire is enhanced.

According to the terminal accommodation portion 14 in this embodiment, the position of the LA terminal (i.e., ring terminal) 13 with the electric wire in the insertion direction thereof is determined by the bottom wall 14e of the groove 14a, so that positioning the LA terminal (i.e., ring terminal) 13 with the electric wire in a screw tightening operation is facilitated. Further, co-turning of the LA terminal (i.e., ring terminal) 13 ascribable to the screw tightening can be restrained by the wing portion 13d, so that the assemblability of the LA terminal (i.e., ring terminal) 13 with the electric wire can be improved. More specifically, the positioning of the LA terminal (i.e., ring terminal) 13 with the electric wire in the insertion direction (vertical direction) thereof is performed by the bottom wall 14e of the groove 14a. The positioning of the LA terminal (i.e., ring terminal) 13 with the electric wire in the horizontal direction thereof is done by the cooperation between the grooves 14d and the wing portion 13d, so that the assemblability of the LA terminal (i.e., ring terminal) 13 with the electric wire can be enhanced. The LA terminal (i.e., ring terminal) 13 with the electric wire can be clamped in close contact with the relay terminal portion 5a, together with the main circuit bus bar 12 by clamping the screw 18.

DESCRIPTION OF REFERENCE NUMERALS AND SIGNS 5 main relay
5a relay terminal portion
10 base plate
11 electric wire
12 main circuit bus bar
13 LA terminal with electric wire
13d wing portion
14 terminal accommodation portion
14a slit
14b space
14d groove
14e bottom wall 15 electric wire holding portion
15a, 15b protrusive pieces
18 screw

What is claimed is:

1. A battery pack controller, comprising:
   a base plate,
   control components including components of a main relay and a precharge circuit mounted on one surface of said main base plate,
   one pair of terminals with electric wires, which are disposed on the other surface of said base plate and which connect the precharge circuit in parallel with the main relay,
   a first main circuit bus bar connected to one electrode of a battery pack, and
   a second main circuit bus bar connected to a lead-out terminal to which an inverter is connected, and
   an electric wire connection portion having protruding a protuberant height from a plane position of the terminal, wherein
   one of the terminals with the electric wires and the first main circuit bus bar, and the other of the terminals with the electric wires and the second main circuit bus bar, are respectively clamped to one pair of relay terminal portions of the main relay by screws;
   each of the terminals with the electric wires has a wing portion which is protruded beyond the protuberant height of the electric wire connection portion from a plane position of the terminal on either a terminal side or an electric wire side of the electric wire connection portion;
   the electric wires are bent and disposed so as to extend from the other surface side of the base plate toward the relay terminal portions on one surface side and are clamped to the relay terminal portions by the screws together with the first and second main circuit bus bars; and
   the base plate is formed with a terminal accommodation portion which accommodates the terminal with the electric wire at a part extending from an electric wire bent portion to the relay terminal portion and is formed having grooves into which the wing portion is inserted.

2. A battery pack controller as claimed in claim 1, wherein the base plate is formed with an electric wire holding portion at an opposite side of the relay terminal portion with respect to the electric wire bent portion along the electric wire, on the other surface side.

3. A battery pack controller as claimed in claim 1, wherein each of the terminals is composed of a ring terminal.

* * * * *